United States Patent [19]

Buzbee

[11] Patent Number: 5,133,072
[45] Date of Patent: Jul. 21, 1992

[54] METHOD FOR IMPROVED CODE GENERATION IN REDUCED INSTRUCTION SET COMPUTERS

[75] Inventor: William B. Buzbee, Milpitas, Calif.

[73] Assignee: Hewlett-Packard Company, Palo Alto, Calif.

[21] Appl. No.: 930,582

[22] Filed: Nov. 13, 1986

[51] Int. Cl.[5] .............................................. G06F 9/45
[52] U.S. Cl. ............................ 395/700; 364/DIG. 1; 364/280; 364/280.4; 364/280.5
[58] Field of Search ... 364/200 MS File, 300 MS File, 364/900 MS File

[56] References Cited

U.S. PATENT DOCUMENTS

| 4,330,822 | 5/1982 | Dodson | 364/200 |
|---|---|---|---|
| 4,374,408 | 2/1983 | Bowles et al. | 364/200 |
| 4,463,423 | 7/1984 | Potash et al. | 364/200 |
| 4,567,574 | 1/1986 | Saadé | 364/900/ |
| 4,589,065 | 5/1986 | Auslander et al. | 364/200 |
| 4,667,290 | 5/1987 | Goss et al. | 364/300 |
| 4,722,071 | 1/1988 | Gates et al. | 364/300 |
| 4,734,854 | 3/1988 | Afshar | 364/200 |
| 4,739,471 | 4/1988 | Baum et al. | 364/200 |
| 4,763,255 | 8/1988 | Hopkins et al. | 364/200 |

OTHER PUBLICATIONS

"The Program Development Process," Joel D. Aron, 1974 by Addison-Wesley Publishing Co., Inc.–section 5.4.1.
"Compiler Design Theory," P. M. Lewis II et al., 1976 by Addison-Wesley Publishing Co., Inc.–section 15.5.
Torsun and Al-Jarrah *Dynamic Analysis of COBOL Programs, Software-Practice and Experience*, vol. 11, 949-961 (1981) pp. 949-961.
Robert Bernhard, *More hardware means less software*, IEEE Spectrum Dec., 1981, pp. 30-36.
Rule, Wilfred P., "Fortran: A Practical Approach with Style and Structure", Prindle, Weber & Schmidt, Boston, Mass., 1980, pp. 335-362.
Predicting Potential COBOL Performance on Low Level Machine Architectures by Jerome A. Otto, Sigplan Notices, V20, #10, Oct. 1985.

Primary Examiner—Gareth D. Shaw
Assistant Examiner—Paul Kulik
Attorney, Agent, or Firm—Roland I. Griffin; Alan H. Haggard

[57] ABSTRACT

A method for efficient generation of complied code is presented. In order to gain significant performance advantage with a minimum of code expansion, out-of-line code sequences are used. An out-of-line code sequence is a series of instructions that are invoked by a simplified calling mechanism in which almost no state-saving is required. Additionally, out-of-line code sequences is designed so that a single copy can exist on a system and all processes running on that system can access it. A series of out-of-line code sequences can be generated, each member of the series being tailored to a particular combination of compile-time information.

2 Claims, 3 Drawing Sheets

Microfiche Appendix Included
(2 Microfiche, 98 Pages)

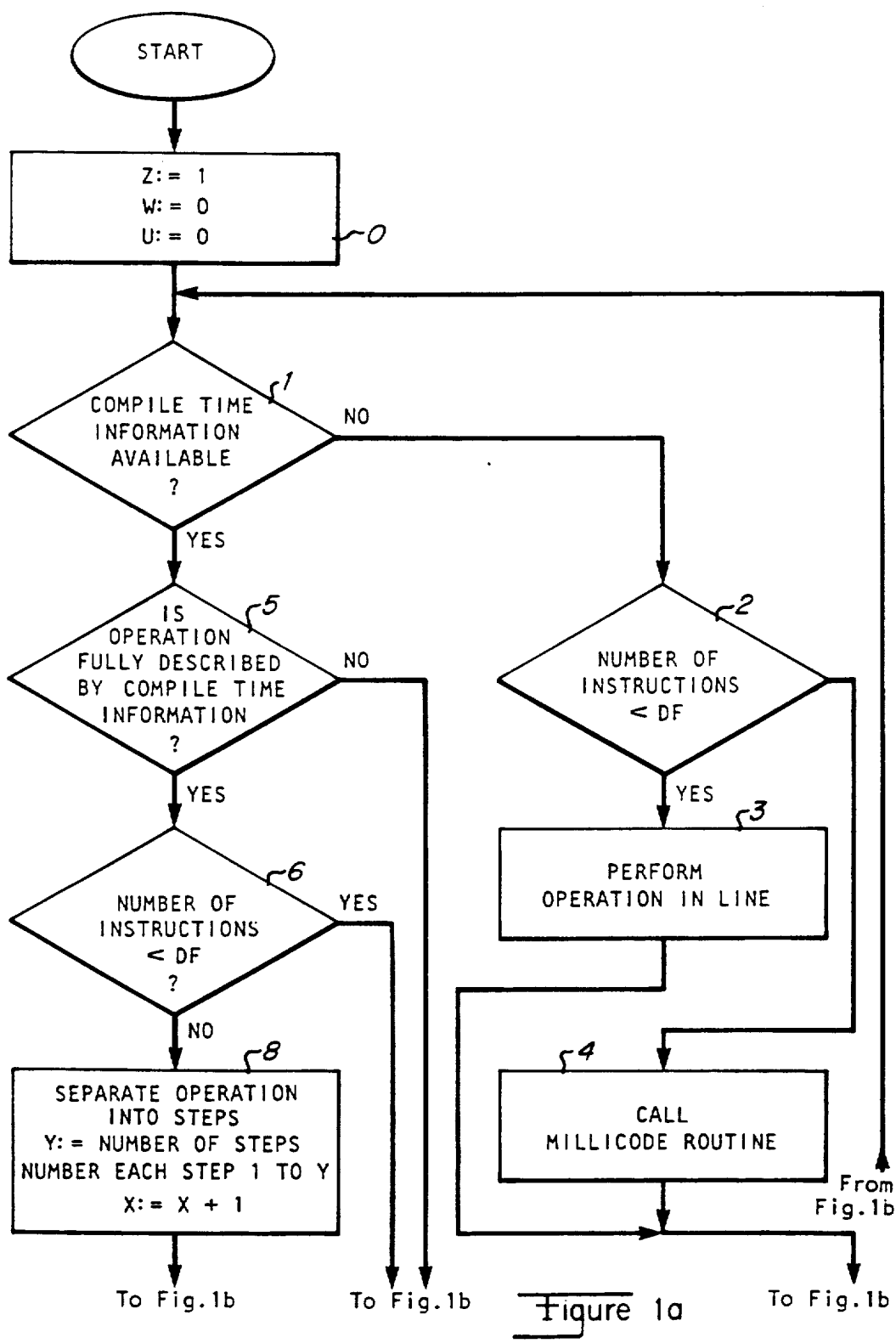

METHOD FOR IMPROVED CODE GENERATION IN REDUCED INSTRUCTION SET COMPUTERS

Microfiche Appendice A set forth programs written in accordance with preferred embodiments of the present invention. Appendix A includes two microfiche for a total of 98 frames.

BACKGROUND

One of the most enduring criticisms of Reduced Instruction Set Computer (RISC) architectures is that they are unable to handle complex operations efficiently. Critics of RISC-like architectures often suggest that applications which rely upon a high percentage of complex operations will execute slowly and/or suffer from excessive code size. By complex operation is meant a task which requires three or more of a machine's most basic instructions to complete. Some obvious and very important examples of complex operations are byte moves, string comparisons and decimal arithmetic. On the other hand, simple operation are those which require only one or two of a machine's most basic instructions to complete.

In traditional Complex Instruction Set Computers (CISC) every machine instruction is performed by the execution of a corresponding microcode program. Microcode programs are made up of micro-instructions. Micro-instructions are instructions which a processor understands. In a sense, CISC systems are really computers inside of computers. The "outer" computer receives assembly language instructions and translates them to micro-instructions. The "inner" computer executes the micro-instructions.

RISC systems, on the other hand, do not use micro-instructions, but execute computer instructions directly. This eliminates the overhead in CISC systems which is associated with transferring of control from the outer computer to the inner computer. In CISC computers, for simple operations, transfer overhead between the inner and the outer computer often requires more time than the actual performance of the operations.

However, for complex operations which require dozens or even hundreds of micro-instructions to complete, the overhead for transferring from the outer computer to the inner computer in CISC systems becomes insignificant. The execution time of micro-instructions becomes the most significant factor in speed of execution. Typically, execution of instructions on a RISC system takes longer than execution of equivalent micro-instructions on a comparable CISC system. Therefore, utilizing the prior art, CISC systems have potential to perform better than RISC systems for complex instructions.

SUMMARY OF THE INVENTION

In accordance with the preferred embodiment of the present invention, a method for efficient generation of compiled code is presented.

When translating complex operations from CISC system micro-code to RISC system instructions, in order to limit the amount of code required, microcode could be directly translated into RISC system instructions, and these RISC system instructions could be placed into run-time libraries which could be called any time the complex operation is to be executed. Such an implementation would keep the amount of in-line code to a minimum, however, this method of translation would not be optimal. One reason such a method would be suboptimal is because of the overhead necessary to access routines in the run-time library and to store and handle all the attendant state information.

Another reason such a method would be suboptimal is because many types of complex operations spend a large amount of time calculating and interpreting information at run-time that is available to compilers at compile-time. Under a CISC system, this information is lost because a compiler cannot transmit such information to microcode at compile time, nor can a compiler alter system microcode to better suit a particular program. Because microcode program space is scarce and expensive, there is typically only a single CISC instruction per class of complex operations. For example, a CISC system may have one string comparison instruction, one decimal addition, etc. The micro code programs associated with these instructions must therefore be capable of handling all situations and must typically make worst-case assumptions. A compiler may know, for example, that the source and target of a byte move do not overlap, but in a CISC system the microcode would have to determine this on its own at run-time.

RISC machines can gain a significant performance advantage by utilizing all available information at compile time to generate highly efficient specifically tailored algorithms which perform complex operations. However, if every complex operation is separately generated and placed in code, significant expansion in the amount of lines of code may result.

In the preferred embodiment of the present invention, in order to gain significant performance advantage with a minimum amount of code expansion, out-of-line code sequences are used. An out-of-line code sequence is a series of instructions that are invoked by a simplified calling mechanism in which almost no state-saving is required. Additionally, each out-of-line code sequence is designed so that a single copy can exist on a system and all processes running on that system can access it. A series of out-of-line code sequences can be generated, each member of the series being tailored to a particular combination of compile-time information. This is unlike microcode where space restrictions may limit the number of microcode routines and which are unable to make assumptions based on information available at compile time.

DESCRIPTION OF THE PREFERRED EMBODIMENT

Figure 1B:
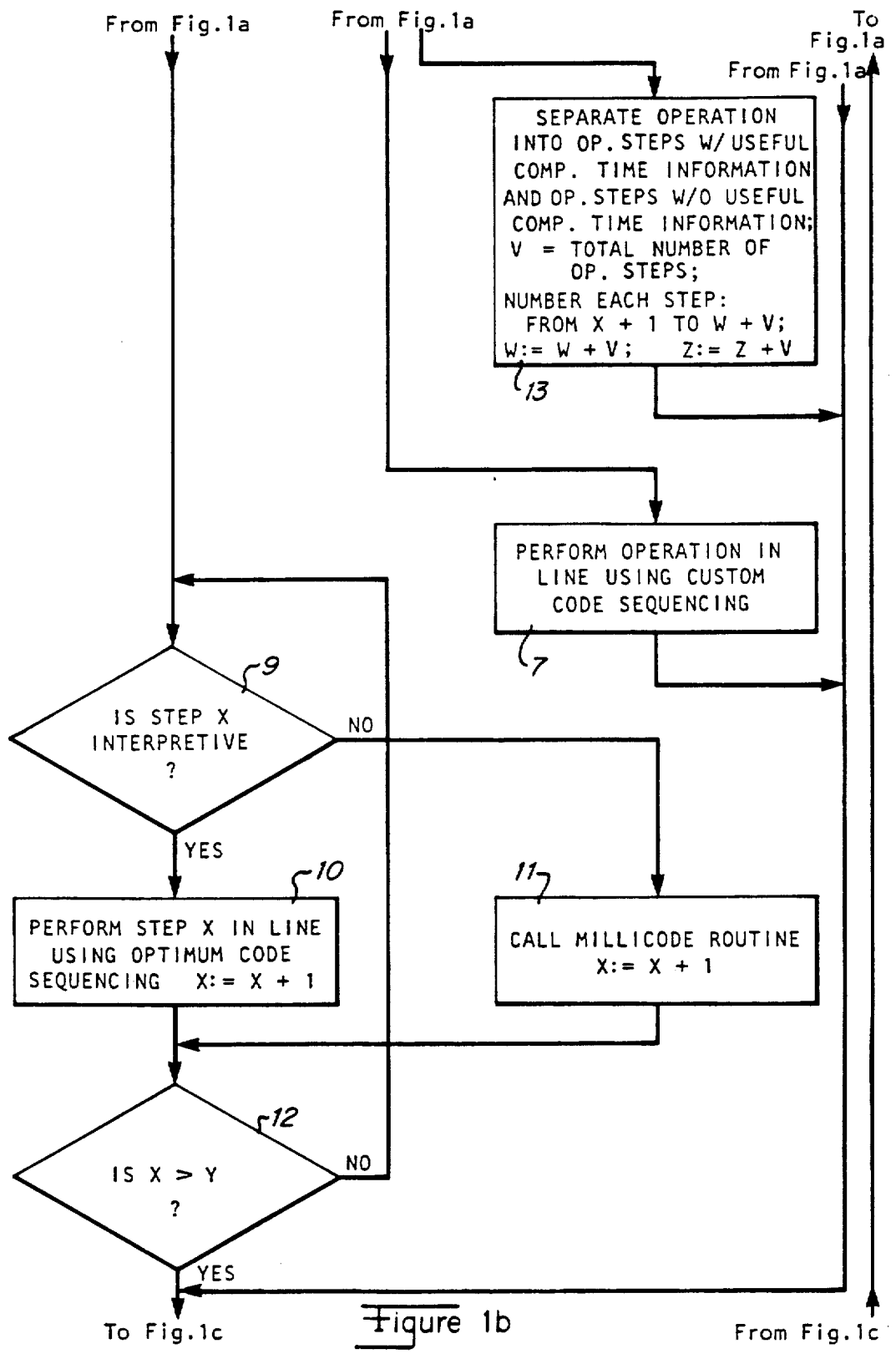
FIGS. 1 (including 1a, 1b and 1c) show a flowchart which illustrates the method by which a compiler evaluates instructions in accordance with the preferred embodiment of the present invention.
Figure 1C:
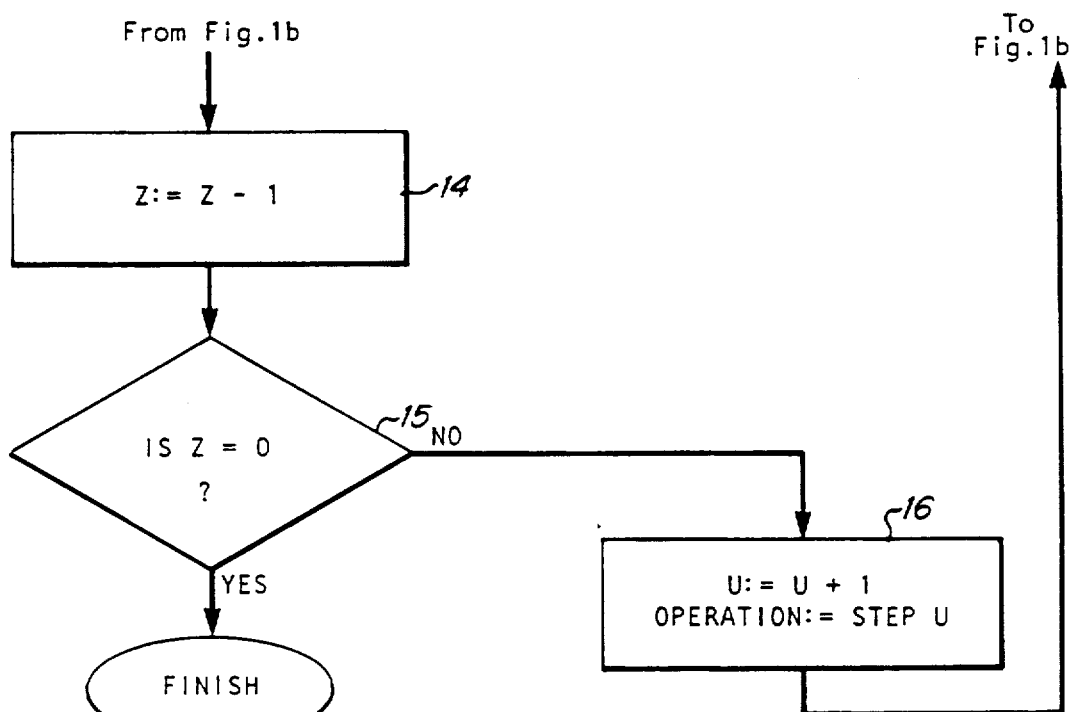
Figure 1:
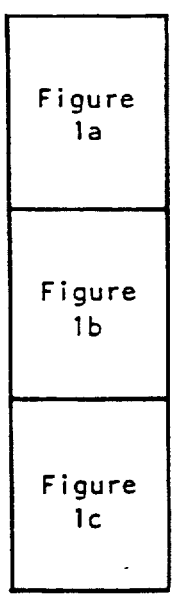

FIG. 1 is a detailed flowchart which shows how an operation may be evaluated and code generated in accordance with the preferred embodiment of the present invention. Table 1 below is a key to the text within the flowchart shown in FIG. 1.

Initialization is done in method step 0. In method step 1, it is determined whether useful compile time information about the operation is available. What is meant by useful compile time information about an operation is any information about the operation which can assist the compiler in selecting an optimized sequence of instructions which perform the operation and which is available at the time code containing the operation is compiled. An optimized sequence of instructions is a sequence of instructions which allows for the execution of an operation using the least number of instructions (space optimized) or allows for the execution of an operation in the least amount of time (speed optimized) or allows for the most favorable combination of space and speed optimization. If, in method step 1, no useful compile time information about the operation is available, in method step 2, it is determined whether the number of instructions required to perform the operation is less than a defined factor which takes into account speed and space related factors. If it is less, in method step 3, the operation is coded entirely in line. If the number of instructions is not less, a call is generated to a general purpose out-of-line code sequence in method step 4.

In method step 5 it is determined whether the operation is fully described by compile-time information. If so, in method step 6, it is determined whether the number of instructions required to perform the operation is less than a predetermined number based on the value of a defined variable which takes into account the speed at which compiled code will be executed and the amount of memory space taken up by instructions which implement the operation. If so, in method step 7, the operation is coded in line using optimum custom code sequencing.

In method step 8 the operation is separated into repetitive and interpretive segments. In method steps 9, 10, 11 and 12, If a segment is interpretive, the segment is performed in line using optimum custom code sequencing; but if a segment is repetitive, a call is generated to one of a set of highly specific repetitive out-of-line code sequences.

An operational step is considered repetitive if it can be performed in a fixed out-of line code sequence using approximately the same number of instructions as would be required for an "optimum" in-line code sequence. What is meant by "optimum" is having the minimum overhead possible. Also, in most RISC architecture computers, "number of instructions" is the same as "number of machine cycles" or "amount of time". Further, to be considered repetitive, an operational step must also occur frequently enough to justify its implementation as an out-of-line code sequence.

An operational step is considered interpretive if it can be performed in far fewer number of instructions using an "optimum" in-line code sequence than would be required for an out-of-line sequence.

If in method step 5, it is determined that the operation is not fully described by compile-time information, in method steps 13, 14, 15 and 16 the operation is separated into operational segments in which useful compile-time information is available and into operational segments in which useful compile-time information is not available. Each operational segment is then considered to be a complex operation and each operational segment is evaluated as a separate operation, starting at method step 1. For example, an operation may consist of an eight byte move followed by a 22-byte blank fill. This operation might commonly occur in the manipulation of character strings. Utilizing the method illustrated in FIG. 1, in method steps 1 and 5, a compiler examining the eight byte move operation would determine that it is fully described by compile-time information. Then the compiler, in method steps 6 and 7, would find that the eight byte move operation may be done in few enough lines of code that the move operation made be written as code entirely in-line with no interpretive overhead.

Next, the compiler would examine the 22-byte blank fill operation. The compiler, in method steps 1 and 5, would determine that the operation was fully described by compile-time information. However, in method step 6, the compiler would find that the amount of in-line instructions required to execute the operation would be excessive. In method step 8, the 22-byte blank fill would be broken into interpretive segments and repetitive segments. For instance, in a machine which operates on 32 bits at a time, i.e, operating on the basis of a 32 bit word, 22-bytes is essentially five words and two bytes. Therefore a 22-byte blank fill could be divided into five full word fills and two partial word fill. The five full word fills are considered repetitive segments and are performed in out-of-line code sequences. The partial word fill would require interpretation at run-time if it were performed in out-of-line code sequences, so it will be performed in-line instead.

The following Table 1 summarizes the action taken at each method step of the flowchart in FIG. 1:

Table 1

Method Step 0: Set "Z" equal to 1. Set "w" equal to 0. Set "u" equal to 0.

Method Step 1: Is useful compile time information about the operation available?

Method Step 2: Is the number of instructions required to perform the operation less than a defined factor which takes into account speed and space related factors?

Method Step 3: Have the operation performed entirely in line

Method Step 4: Generate a call to as general purpose external routine.

Method Step 5: Is the operation fully described by compile-time information?

Method Step 6: Is the number of instructions required to perform the operation less than a predetermined number based on the value of a defined variable which takes into account the speed at which compiled code will be executed and the amount of memory space taken up by instructions which implement the operation?

Method Step 7: Have the operation performed in line using optimum custom code sequencing.

Method Step 8: Separate the operation into repetitive and interpretive steps. Set "y" equal to the total numbers of steps. Assign each step a number from 1 to y. Set "x" equal to 1.

Method Step 9: Is step x interpretive?

Method Step 10: Have step x performed in line using optimum custom code sequencing. Set x equal to x+1.

Method Step 11: Generate a call to one of a set of highly specific repetitive external procedures. Set x equal to x+1.

Method Step 12: Is x greater than y?

Method Step 13: Separate the operation into operational steps in which useful compile-time information is available and into operational steps in which useful compile-time information is not available. Set v equal to the total number of operational steps. Assign each operational step a number from x+1 to w+v. Set w equal to w+v. Set z equal to z+v.

Method Step 14: Set z equal to Z−1.

Method Step 15: Is Z equal to 0?

Method Step 16: Set u equal to u+1. Set the operation equal to operational step u.

In Appendix B is given a generalized code sequence which is an implementation of the flowchart shown in FIG. 1. In appendix C is given an example of code which is generated as a result of employing the preferred embodiment of the present invention.

In the example given in Appendix C, it is noteworthy that only four instruction are devoted to overhead. Specifically, this overhead includes only loading the address of the beginning of the fill, loading the fill character, branching to out-of-line code sequences, and returning from out-of-line code sequences. In a typical CISC system, much more time would be devoted to overhead.

In the attached Appendix A is given a listing of code for a compiler which operates in accordance with the preferred embodiment of the present invention. The compiler uses information available at compile time to generate code sequences which are significantly more efficient than in the prior art. The following are some of the operations within the code in which using the present invention results in more efficient code generation.

The invention results in more efficient code generation when utilized with the following operations, which are more fully described in the code: byte moves, fills, string comparisons, decimal addition and subtraction, decimal comparison, decimal rounding, decimal multiplication and division.

The preferred embodiment of the present invention describes an implementation of the present invention for a RISC machine; however, the advantages may also be gained by utilizing the invention in other than RISC machines.

I claim:

1. A method, for use by a compiler program running on a computer, for efficient generation of compiled code, the method comprising the steps of:
   (c) creating out-of-line code sequences, a first portion of the out-of-line code sequences being general purpose out-of-line code sequences which completely perform operations and a second portion of the out-of-line code sequences being specific purpose out-of-line code sequences each of which implements a segment of an operation, each of the implemented segments used in the generation of code for more than one operation;
   (b) determining by the compiler program whether at compile time there is available to the compiler program information about a first operation which may be used to at least partially perform the first operation;
   (c) if information about the first operation which may be used to at least partially perform the first operation is not available to the compiler program,
      determining by the compiler program whether code for the first operation can be generated using less than a predetermined number of instructions, and
      generating code by the compiler program which when executed by a computer will perform the first operation in line if code for the first operation can be generated using less than the predetermined number of instructions, otherwise generating code which calls a general purpose out-of-line code sequence which when executed will perform the first operation; and
   (d) if information about the first operation which may be used to at least partially perform the first operation is available to the compiler program and the compiler program determines the first operation can be fully described by information available to the compiler program at compile time, generating code by the compiler program which when executed will perform the first operation so that for every segment of the first operation which the compiler program determines is implemented by one of the specific purpose out-of-line code sequences a specific purpose out-of-line code sequence which implements the segment of the first operation is called and so that for every segment of the first operation which the compiler program determines is not implemented by one of the specific purpose out-of-line code sequences, code which implements the segment is placed in-line.

2. A method as in claim 1 additionally comprising the steps of:
   (e) if information about the first operation which may be used to at least partially perform the first operation is available to the compiler program but the operation cannot be fully described by the information, dividing by the compiler program the first operation into first operational segments of the first operation about which information which may be used to perform each first operational segment is available to the compiler program and into second operational segments of the first operation about which information which may be used to perform each second operational segment is not available to the compiler program, and for each first operational segment from the first operational segments and for each second operational segment from the second operational segments repeating steps (b) through (d) with an operational segment becoming the first operation.

* * * * *

UNITED STATES PATENT AND TRADEMARK OFFICE
CERTIFICATE OF CORRECTION

PATENT NO.    : 5,133,072
DATED         : July 21, 1992
INVENTOR(S)   : William W. Buzbee It is certified that error appears in the above-identified patent and that said Letters Patent is hereby corrected as shown below:

Column 5,
Line 41, delete "(c)" and insert therefor -- (a) --

Signed and Sealed this

Twenty-second Day of March, 2005

JON W. DUDAS
*Director of the United States Patent and Trademark Office*